May 24, 1949.    G. C. SCHWANTES ET AL    2,470,871
HEADSTOCK ATTACHMENT FOR LATHES
Filed Nov. 3, 1945

INVENTOR
GILBERT C. SCHWANTES
ROBERT C. SCHWALBACH
BY
Wheeler, Wheeler & Wheeler
ATTORNEYS Patented May 24, 1949

2,470,871

UNITED STATES PATENT OFFICE 2,470,871

HEADSTOCK ATTACHMENT FOR LATHES

Gilbert C. Schwantes and Robert C. Schwalbach, Milwaukee, Wis.

Application November 3, 1945, Serial No. 626,465

4 Claims. (Cl. 82—28)

Our invention relates to improvements in headstock attachments for lathes.

The object of our invention is to provide means whereby any ordinary lathe may have its headstock adjusted for the cutting of gear blanks or other devices to any desired bevel.

In the drawings.

Like parts are identified by the same reference characters throughout the several views.

Figure 1:
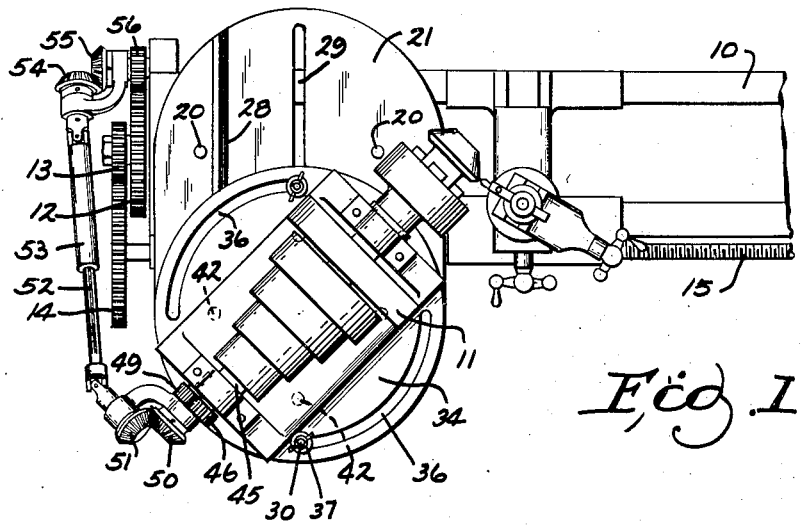
Figure 1 is a plan view of a lathe embodying our invention.
Figure 2:
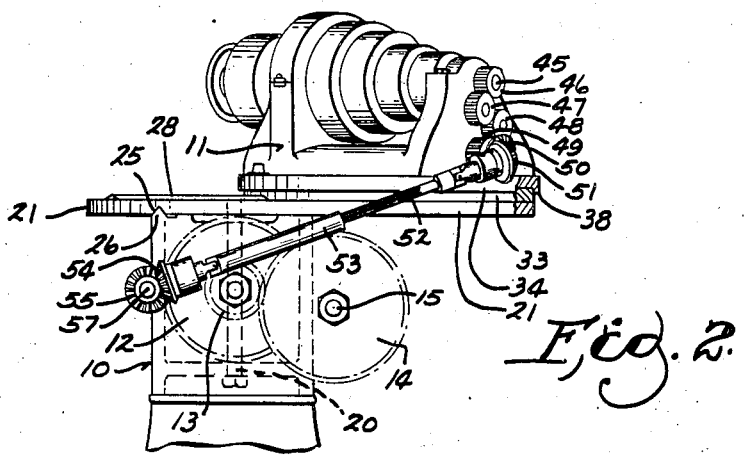
Figure 2 is an end elevation of the same.
Figure 3:
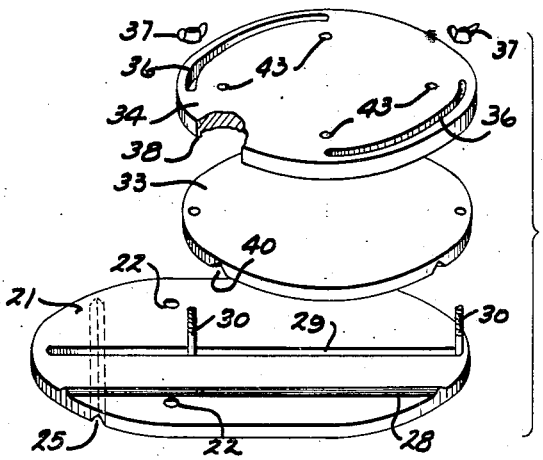
Figure 3 is a diassembled view in perspective of the headstock adjusting plates.

The bed 10, headstock 11, and motion transmitting gears 12, 13 and 14 for actuating the cross slide drive shaft 15 may be of any ordinary construction. But instead of bolting the headstock to the bed as in an ordinary lathe, the connecting bolts are removed and other bolts 20 substituted to connect an oval headstock mounting plate 21 to the bed, the bolts 20 screwing into threaded mounting plate 21.

The plate 21 has a V-shaped groove 25 in its under surface to receive a rib 26 on the bed. Ordinarily such ribs 26 engage in a groove formed in the under surface of the headstock to assist the bolts in rigidly connecting the head stock to the bed. But in our improved construction, the ribs 26 assist the bolts 20 in securing the mounting plate 21 to the bed.

The upper surface of the plate 21 is provided with a rib 28, preferably V-shaped in cross section, and parallel thereto the plate has a slot 29 through which bolts 30 may be passed to connect this plate with a slide plate or disk 33 and an oscillatory plate or table 34 upon which the base of the headstock may be mounted. The bolts 30 pass through arcuate slots 36 in the plate or table 34 and clamping thumb nuts 37 are applied to the bolts 30 to hold these parts in assembled relation. The oscillatory plate or table 34 has a marginal flange 38 within which the slide plate 33 may be received.

The slide plate or disk 33 is provided with a V-shaped groove 40 in its under surface to receive the rib 28 on the mounting plate 21, and by loosening the thumb nuts, the bolts 30, with the superposed slide plate 33 and oscillatory plate 34, may be moved along the slot 29 to adjust them to various positions transversely of the bed 10.

When the attachment is to be used, the headstock is mounted on the oscillatory disk 34, to which it is rigidly connected by suitable bolts 42 passing through the holes 43 and threaded into the base of the head stock. Thereupon the disk 34 may be connected to the slide plate 33 and mounting plate 21 by the bolts 30 and adjusted transversely of the lathe bed by means of the slide 33. The disk and attached headstock may also be adjusted by oscillation upon the slide plate 33 to a degree limited only by the length of the arcuate slots 36 in disk 34.

In the ordinary lathe, motion is transmitted from the headstock spindle 45 to the cross slide drive shaft 15 through the train of gears 46, 47, 48, 49, 12, 13, and 14. But when applying our attachment, the cross slide drive shaft may be actuated from any suitable source of power. In the embodiment illustrated, we add a bevel gear 50 to the gear wheel 49 and drive the wheel 12 through the bevel gear 51, knuckle jointed telescopic shaft sections 52 and 53, bevel gears 54 and 55, and a spur gear 56 supported from the bed by a fixed axle 57 and meshing with the teeth on the gear wheel 12. The telescopic knuckle jointed shaft sections 52 and 53 allow the headstock to be adjusted laterally to a distance permitted by the length of the slot 29 in the mounting plate 21, and the knuckle joints allow the head stock to be oscillated on the disk 34 to the extent permitted by the length of the slots 36. The bolts 30 and thumb nuts 37 allow the headstock to be rigidly secured in any one of these possible adjustments, whereby the work indicated at A in Figure 1 may be held at any desired angle in various positions of lateral adjustment with reference to the working table B.

It will, of course, be understood that by removing our headstock adjusting attachment the headstock may be bolted directly to the bed of the lathe either by the bolts 20 or by somewhat longer similar bolts adapted to connect the headstock to the bed. Also, that shaft sections 52 and 53 have splined connection with each other to adapt them for transmission of rotary motion.

We claim:

1. An attachment for a lathe having a lathe bed and headstock, said attachment comprising a mounting plate adapted to be secured to the bed in a transversely extending position and provided with a slot also extending transversely of the bed, a slide bolted to the mounting plate by bolts extending through said slot, a headstock supporting plate connected to the slide by said bolts and having arcuate slots through which the bolts extend, means for securing the headstock supporting plate to the under surface of a headstock, and means for transmitting motion from the headstock spindle to the working elements of the lathe in various positions of headstock adjustment permitted by said slot and headstock supporting plate.

2. An attachment for a lathe of the type having a bed, a headstock normally fixed thereto and a tool movable longitudinally and transversely respecting the bed, said attachment comprising outermost and intermediate plates superimposed, the intermediate plate having apertures, one of the outermost plates having arcuate slots registering with the apertures, and the third plate having a rectilinear slot registering with the apertures, and a single set of clamping bolts extending through said slots and apertures and comprising means for clamping one of the outermost plates in slideable and oscillatory adjustment respecting the other outermost plate, whereby said attachment may be interposed between the headstock and bed of the lathe to comprise a means for adjusting the headstock so that work mounted thereon may be machined with a bevel by the rectilinear movement of the tool in one of the directions in which the tool is movable.

3. An attachment for a lathe having a bed and driving gearing, a headstock normally fixed so the bed and provided with a spindle, a chuck and driven gearing meshing with the driving gearing, and a tool carriage having means supporting it for longitudinal and transverse movement on the bed, said attachment comprising three superimposed plates, the outermost of which are respectively adapted for connection with the headstock and the bed, said outermost plates being respectively oscillatory and slideable respecting the intermediate plate, clamping means normally locking said plates against sliding and oscillatory displacement, and an auxiliary driving connection from the driving gearing to the driven gearing, said connection comprising an extensible shaft which includes two shaft parts in splined engagement, gears connected with said shaft parts and bearing supports for the respective shaft parts, the said attachment being adapted to be interposed between the bed and headstock of such lathe, whereby work chucked to the spindle of the lathe may be machined with a bevel by means of a tool mounted on the tool carriage for rectilinear movement in but one of the directions in which such carriage is movable.

4. The combination set forth in claim 3 in which one of said shaft parts comprises a universal joint.

GILBERT C. SCHWANTES.
ROBERT C. SCHWALBACH.

REFERENCES CITED

The following references are of record in the file of this patent:

UNITED STATES PATENTS

| Number | Name | Date |
| --- | --- | --- |
| 338,749 | Hunt | Mar. 30, 1886 |
| 680,167 | Nitterauer | Aug. 6, 1901 |

FOREIGN PATENTS

| Number | Country | Date |
| --- | --- | --- |
| 572,075 | France | Oct. 19, 1923 |